(12) United States Patent
Takada et al.

(10) Patent No.: US 10,207,645 B2
(45) Date of Patent: Feb. 19, 2019

(54) VEHICLE INCLUDING MIRROR WITH IMAGE DISPLAY APPARATUS

(71) Applicant: NITTO DENKO CORPORATION, Ibaraki-shi, Osaka (JP)

(72) Inventors: Katsunori Takada, Ibaraki (JP); Tadayuki Kameyama, Ibaraki (JP); Yoshitsugu Kitamura, Ibaraki (JP); Keisuke Kimura, Ibaraki (JP); Hiroki Kuramoto, Ibaraki (JP)

(73) Assignee: NITTO DENKO CORPORATION, Ibaraki-shi (JP)

( * ) Notice: Subject to any disclaimer, the term of this patent is extended or adjusted under 35 U.S.C. 154(b) by 38 days.

(21) Appl. No.: 15/011,836

(22) Filed: Feb. 1, 2016

(65) Prior Publication Data

US 2016/0221506 A1 Aug. 4, 2016

(30) Foreign Application Priority Data

Feb. 2, 2015 (JP) ................................ 2015-018654

(51) Int. Cl.
| | |
|---|---|
| *B60R 1/12* | (2006.01) |
| *B60R 1/04* | (2006.01) |
| *B60R 1/08* | (2006.01) |
| *G02B 27/14* | (2006.01) |
| *G02B 27/28* | (2006.01) |

(52) U.S. Cl.
CPC ............... *B60R 1/12* (2013.01); *B60R 1/04* (2013.01); *B60R 1/083* (2013.01); *B60R 1/086* (2013.01);
(Continued)

(58) Field of Classification Search
CPC .. B60R 1/02; B60R 1/025; B60R 1/04; B60R 1/08; B60R 1/083; B60R 1/086;
(Continued)

(56) References Cited

U.S. PATENT DOCUMENTS

| | | | |
|---|---|---|---|
| 6,646,801 B1 * | 11/2003 | Sley | .................... G02B 27/281 359/240 |
| 9,827,908 B2 | 11/2017 | Konuki | |

(Continued)

FOREIGN PATENT DOCUMENTS

| | | |
|---|---|---|
| EP | 2 789 505 A1 | 10/2014 |
| JP | 60-233622 A | 11/1985 |

(Continued)

OTHER PUBLICATIONS

Extended European Search Report dated Jun. 10, 2016, issued in counterpart European Patent Application No. 16153594.3. (9 pages).

*Primary Examiner* — Stephone B Allen
*Assistant Examiner* — Adam W Booher
(74) *Attorney, Agent, or Firm* — Westerman, Hattori, Daniels & Adrian, LLP

(57) ABSTRACT

A vehicle includes: an image display mirror including a first polarizing plate, a half mirror, and an image display apparatus in the stated order from a viewer side; and a second polarizing plate, in which: the image display mirror is arranged so as to b viewable by a driver of the vehicle; the half mirror is configured to be oriented in different directions between when an image is displayed on the image display apparatus and when the image is not displayed thereon; the second polarizing plate is arranged so that light transmitted through the second polarizing plate reaches a first polarizing plate side of the image display mirror when the image is displayed on the image display apparatus; and the vehicle is configured so that the transmitted light of the second polarizing plate reaching the image display mirror is prevented from being transmitted through the first polarizing plate.

5 Claims, 3 Drawing Sheets

(52) U.S. Cl.
CPC ......... *G02B 27/144* (2013.01); *G02B 27/281* (2013.01); *B60R 2001/1215* (2013.01)

(58) Field of Classification Search
CPC ... B60R 1/087; B60R 1/12; B60R 2001/1215; B60J 3/00; B60J 3/007; B60J 3/06; G02B 27/14; G02B 27/144; G02B 27/28; G02B 27/281
See application file for complete search history.

(56) References Cited

U.S. PATENT DOCUMENTS

| | | |
|---|---|---|
| 2004/0008168 A1 | 1/2004 | Chang |
| 2011/0170189 A1* | 7/2011 | Jackson, II ................ B60J 3/06 359/492.01 |
| 2014/0347488 A1 | 11/2014 | Tazaki et al. |
| 2014/0368657 A1 | 12/2014 | Konuki |

FOREIGN PATENT DOCUMENTS

| | | |
|---|---|---|
| JP | 3-243914 A | 10/1991 |
| JP | 11-125708 A | 5/1999 |
| JP | 2002-120649 A | 4/2002 |
| JP | 2004-212782 A | 7/2004 |
| JP | 2005-75029 A | 3/2005 |
| JP | 2005-145151 A | 6/2005 |
| JP | 2007-264038 A | 10/2007 |
| JP | 5273286 B1 | 8/2013 |
| JP | 2013-244752 A | 12/2013 |
| JP | 2014-41274 A | 3/2014 |

* cited by examiner

VEHICLE INCLUDING MIRROR WITH IMAGE DISPLAY APPARATUS

This application claims priority under 35 U.S.C. Section 119 to Japanese Patent Application No. 2015-018654 filed on Feb. 2, 2015, which is herein incorporated by references.

BACKGROUND OF THE INVENTION

1. Field of the Invention

The present invention relates to a vehicle. More specifically, the present invention relates to a vehicle including a mirror with an image display apparatus.

2. Description of the Related Art

A technology involving combining a rear-view mirror for a vehicle with an image display apparatus to display an image has heretofore been known. For example, Japanese Patent No. 5273286 discloses an image display mirror including a half mirror arranged on the front surface (viewer side surface) of a monitor. In the image display mirror, the rear can be viewed with a reflected image provided by the half mirror. Meanwhile, when an image is displayed on the monitor, the image can be viewed through the half mirror.

Such image display mirror involves a problem in that, for example, when the quantity of light from the rear of a vehicle is large, the reflected image inhibits the visibility of the image displayed on the monitor. Japanese Patent No. 5273286 proposes the following technology. An influence of the reflected image is reduced by making the angle of the half mirror when a viewer (occupant) views the rear and the angle when the viewer views the image of the monitor different from each other. According to such technology, the influence of the reflected image provided by the half mirror can be reduced by adjusting the angle of the half mirror so that when the monitor image is viewed, the reflected image becomes an image that does not inhibit the visibility of the monitor image, specifically so that a ceiling is mirrored by reflection.

However, when it is difficult to turn the reflected image provided by the half mirror into the image that does not inhibit the visibility of the monitor image, e.g., when the image display mirror of Japanese Patent No. 5273286 is applied to a vehicle including a ceiling that transmits light, such as a panoramic roof or a sunroof, or a convertible car, the influence of the reflected image cannot be reduced by the mirror.

SUMMARY OF THE INVENTION

The present invention has been made to solve the conventional problems, and an object of the present invention is to provide a vehicle including an image display mirror including a half mirror and an image display apparatus, which reduces an influence of a reflected image provided by the half mirror to enable the viewing of an image displayed on the image display apparatus with high visibility.

A vehicle according to one embodiment of the present invention includes: an image display mirror including a first polarizing plate, a half mirror, and an linage display apparatus in the stated order from a viewer side; and a second polarizing plate, in which: the image display mirror is arranged so as to be viewable by a driver of the vehicle; the half mirror is configured to be oriented in different directions between when an image is displayed on the image display apparatus and when the image is not displayed thereon; the second polarizing plate is arranged so that light transmitted through the second polarizing plate reaches a first polarizing plate side of the image display mirror when the image is displayed on the image display apparatus; and the vehicle is configured so that the transmitted light of the second polarizing plate reaching the image display mirror is prevented from being transmitted through the first polarizing plate.

In one embodiment of the present invention, the half mirror is configured to have, when the image is not displayed, such an arrangement, and an angle that, the driver is capable of observing a rear with a reflected image, and to be oriented, when the image is displayed, in a direction different from that when the image is not displayed.

In one embodiment of the present invention, the vehicle includes a ceiling that transmits light, and the second polarizing plate is arranged on the ceiling.

According to another aspect of the present invention, there is provided a set including an image display mirror and a second polarizing plate. The set includes: an image display mirror including a first polarizing plate, a half mirror, and an image display apparatus in the stated order from a viewer side; and a second polarizing plate, in which when the second polarizing plate is arranged so that light transmitted through the second polarizing plate reaches a first polarizing plate side of the image display mirror, the transmitted light of the second polarizing plate reaching the image display mirror is prevented from being transmitted through the first polarizing plate.

In the vehicle according to the one embodiment of the present invention, an influence of a reflected image provided by the half mirror is reduced, and hence the visibility of an image displayed on the image display apparatus is excellent.

DETAILED DESCRIPTION OF THE PREFERRED EMBODIMENTS

Embodiments of the present invent ion are hereinafter described with reference to the drawings. However, the present invention is not limited to these embodiments.

A. Outline of Vehicle

Figure 1:
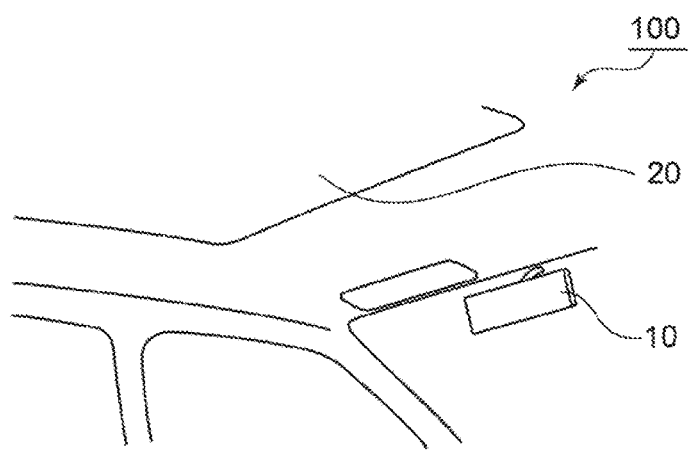
FIG. 1 is a schematic view of a vehicle according to one embodiment of the present invention.
Figure 2:
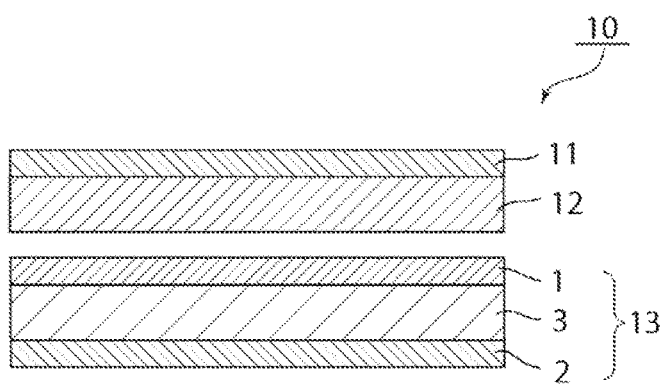
FIG. 2 is a schematic sectional view of an image display mirror to be used in the one embodiment of the present invention.

FIG. 1 is a schematic view of a vehicle according to one embodiment of the present invention. A vehicle 100 includes an image display mirror 10 and a second polarizing plate 20. In addition, FIG. 2 is a schematic sectional view of the image display mirror 10 to be used in the one embodiment of the present invention. The image display mirror 10 of this embodiment can be arranged so as to be viewable by a driver of the vehicle, and can be used as, for example, a rear-view mirror (room mirror) of the vehicle. The image display mirror 10 includes a first polarizing plate 11, a half mirror 12, and an image display apparatus 13 in the stated order from a viewer side. The half mirror 12 has a light-reflecting function and a light-transmitting function. The image display mirror 10 enables an occupant of the vehicle to view the rear by virtue of the light-reflecting function of the half mirror 12. When a reflected image is viewed by virtue of the light-reflecting function of the half mirror 12, the image display apparatus 13 is brought into a state in which no image is displayed. Meanwhile, in the image display mirror 10, an image displayed on the image display apparatus 13 can be viewed by virtue of the light-transmitting function of the half mirror 12. The image display apparatus 13 displays, for example, a image provided by an external camera that mirrors the rear of the vehicle. With such construction, even, for example, when an obstacle (such as a passenger or baggage) is present in the vehicle and hence the rear of the vehicle cannot be sufficiently observed with the reflected image of the half mirror, the safety of the vehicle can be secured by displaying the image provided by the external camera on the image display apparatus.

Figure 3A:
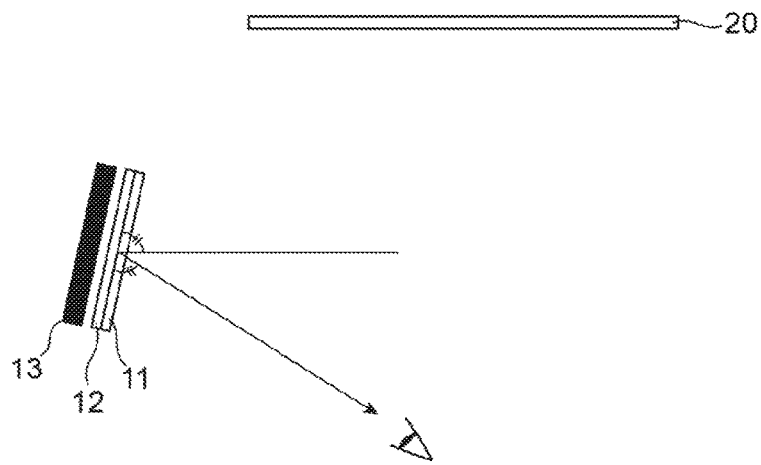
FIG. 3A and FIG. 3B are each a schematic view for illustrating an action of the present invention.
Figure 3B:
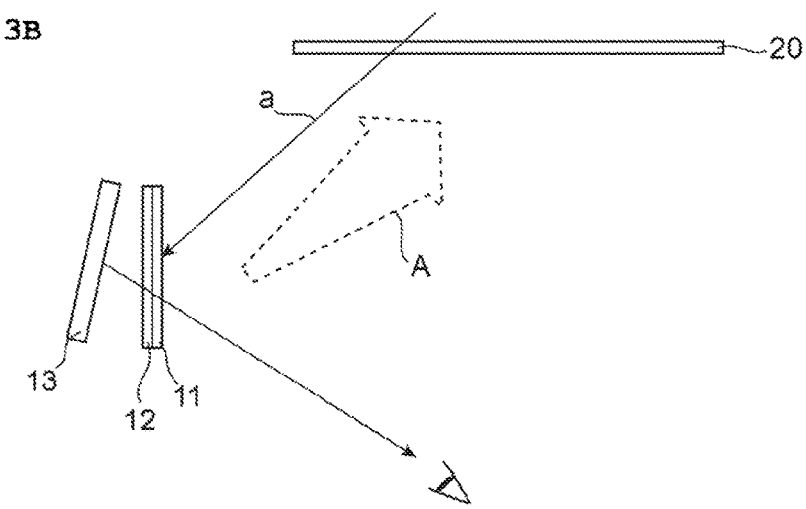

In the image display mirror 10, the orientation of at least the half mirror can be changed, and the half mirror 12 is configured to be oriented in different directions between when the image is displayed on the image display apparatus of the image display mirror 10 and when the image is not displayed thereon. More specifically, as illustrated in FIG. 3A and FIG. 3B, the half mirror 12 can have, when the image is not displayed (FIG. 3A), such an arrangement and an angle that the driver is capable of observing the rear with the reflected image, and is configured to be oriented, when the image is displayed (FIG. 3B), in a direction different from that when the image is not displayed.

The second polarizing plate is arranged so that light transmitted through the second polarizing plate reaches the first, polarizing plate side (viewer side) of the image display mirror when the image is displayed on the image display apparatus. More specifically, the second polarizing plate 20 can be arranged at a position that satisfies all of the following (i) to (iii):

(i) a position except a position between the driver (viewer) and the image display mirror, i.e., the position at which the driver cannot view the image display mirror through the second polarizing plate;

(ii) a position in a regular reflection direction A from the position of an eye of the driver with reference to the reflection surface of the half mirror when the image is displayed (the position at which the second polarizing plate is mirrored in the half mirror when viewed from the position of the eye of the driver in the case where it is assumed that the first polarizing plate is not present); and (iii) a position that is not mirrored in the half mirror when viewed from the position of the eye of the driver when the image is not displayed (the position at which the second polarizing plate is not mirrored in the half mirror when viewed from the position of the eye of the driver even in the case where it is assumed that the first polarizing plate is not present).

The position that satisfies ail of the (i) to (iii) is, for example, a ceiling of the vehicle. In one embodiment, the vehicle of the present invention includes a ceiling (a sunroof or a panoramic roof) that transmits light, and the second polarizing plate is arranged on the ceiling (FIG. 1). One of the achievements of the present invent ion lies in that while the vehicle includes the ceiling that transmits light, the visibility of the image display apparatus can be improved by changing the orientation of the half mirror. In addition, in another embodiment, the second polarizing plate is arranged on a side window. In still another embodiment, the second polarizing plate can be arranged at a position between a window of the vehicle (such as a side window, a sunroof, or a panoramic roof) and the image display mirror, the position satisfying all of the (i) to (iii). In the present invention, an influence of ambient light is suppressed and hence the visibility of the image display apparatus can be improved, the number of constraints on the shape of the vehicle is small, and a desired effect can be obtained even when the ambient light is liable to enter the vehicle.

The vehicle of the present invention, is configured so that the transmitted light of the second polarizing plate reaching the image display mirror (light a in FIG. 3B) is prevented from being transmitted through the first polarizing plate 11. It should be noted that the phrase "light is prevented from being transmitted" as used herein includes the case where light is substantially prevented from being transmitted, and includes the case where the transmittance of the light is 10% or less (preferably 2% or less). The transmitted light of the second polarizing plate is preferably absorbed by the first polarizing plate 11. In one embodiment, the vehicle is constituted by: using a polarizing plate including a linear polarizer (linear polarizing plate) as each of the first polarizing plate 11 and the second polarizing plate 20; and adjusting the angle of the linear polarizer of each of both the polarizing plates so that linearly polarized light generated by being transmitted through the second polarizing plate 20 is absorbed by the first polarizing plate 11. In another embodiment, the vehicle is constituted by: using a circularly polarizing plate as each of the first polarizing plate 11 and the second polarizing plate 20; and adapting the first polarizing plate 11 to absorb circularly polarized light, generated by being transmitted through the second polarizing plate 20. It should be noted that when the circularly polarizing plate is used as the first polarizing plate 11, an image display mirror for vehicles excellent in visibility for a user of a pair of polarized sunglasses can be obtained.

In the present invention, when the image display apparatus does not display any image, the reflected image of the half mirror is viewed. On the other hand, when the image display apparatus displays an image, light entering from the regular reflection direction from the driver with reference to the half mirror is absorbed by the first polarizing plate. Accordingly, an influence of the reflected image is suppressed and hence the image of the image display apparatus becomes easy to view.

B. Image Display Mirror

As described above, the image display mirror includes the first polarizing plate 11, the half mirror 12, and the image display apparatus 13 in the stated order from the viewer side.

In the image display mirror, the half mirror is configured so that its angle (orientation) is changeable. The angle of only the half mirror may be changeable, or the following construction is also permitted: the angle of the half mirror can be changed together with the first polarizing plate and/or the image display apparatus. Any appropriate mechanism can be adopted as a mechanism for changing the angle of the half mirror. For example, a mechanism described in Japanese Patent No. 5273286 can be adopted. The description of the patent literature is incorporated herein by reference.

Figure 4A:
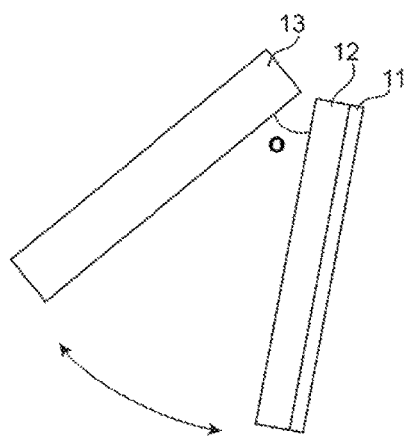
FIG. 4A and FIG. 4B are each a schematic view of the image display mirror to be used in the one embodiment of the present invention.
Figure 4B:
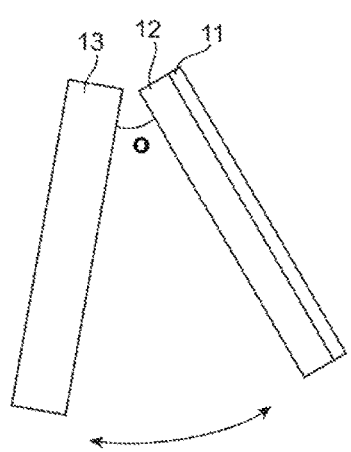

In one embodiment, as illustrated in FIG. 4A and FIG. 4B, an angle o formed between the reflection surface of the half mirror and the image display surface of the image display apparatus is set to be more than 0° and 45° or less. In the image display mirror of such construction, the orientation of the half mirror when a driver attempts to view a reflected image (i.e., when the half mirror mirrors the rear as the reflected image) as illustrated in FIG. 4A, and the orientation of the half mirror when the driver attempts to view an image displayed on the image display apparatus (i.e., when the driver wishes to suppress an influence of the reflected image of the half mirror) as illustrated in FIG. 4B can be made different from each other by changing the orientation of the whole image display mirror. With such construction, the half mirror and the image display apparatus can be brought into close contact with each other by interlayer filling as described later. In this embodiment, the angle o formed between the reflection surface of the half mirror and the image display surface of the image display apparatus is preferably from 5° to 40°, more preferably from 10° to 30°.

The first, polarizing plate and the half mirror, and/or the half mirror and the image display apparatus may be in contact with each other or may be out of contact with each other. It is preferred that a gap between the first polarizing plate and the half mirror be filled with a transparent resin, and both the members be in close contact with each other. Similarly, a gap between the half mirror and the image display apparatus is preferably filled with a transparent resin. When the first polarizing plate and the half mirror, and/or the half mirror and the image display apparatus are brought into close contact with each other as described above, an image display mirror excellent in efficiency with which light is utilized and excellent in visibility of a displayed image can be obtained. Any appropriate resin film, pressure-sensitive adhesive, or the like can be used in interlayer filling. A pressure-sensitive adhesive excellent in transparency is preferably used as the pressure-sensitive adhesive. Examples thereof include an acrylic pressure-sensitive adhesive, a silicone-based pressure-sensitive adhesive, and a rubber-based pressure-sensitive adhesive.

B-1. First Polarizing Plate

A linear polarizing plate (LP1) or a circularly polarizing plate (CP1) can be used as the first polarizing plate.

B-1-1. Linear Polarizing Plate

The polarizing plate typically has a polarizer and a protective layer arranged on one side, or each of both sides, of the polarizer. The polarizer is typically an absorption-type polarizer.

The transmittance (also referred to as "single axis transmittance") of the polarizer at a wavelength of 589 nm is preferably 41% or more, more preferably 42% or more. It should be noted that a theoretical upper limit for the single axis transmittance is 50%. In addition, its polarization degree is preferably from 99.5% to 100%, more preferably from 99.9% to 100%.

Any appropriate polarizer may be used as the polarizer. Examples thereof include: a polarizer obtained by adsorbing a dichroic substance, such as iodine or a dichroic dye, onto a hydrophilic polymer film, such as a polyvinyl alcohol-based film, a partially formalized polyvinyl alcohol-based film, or an ethylene-vinyl acetate copolymer-based partially saponified film, and subjecting the resultant film to uniaxial stretching; and polyene-based alignment films, such as a dehydrated product of polyvinyl alcohol and a dehydrochlorinated product of polyvinyl chloride. Of those, a polarizer obtained by adsorbing a dichroic substance, such as iodine, onto a polyvinyl alcohol-based film and subjecting the resultant film to uniaxial stretching is particularly preferred because of its high polarized dichromaticity. The polarizer has a thickness of preferably from 0.5 µm to 80 µm.

The polarizer obtained by adsorbing iodine onto a polyvinyl alcohol-based film and subjecting the resultant film to uniaxial stretching is typically produced by dyeing polyvinyl alcohol through immersion in an aqueous solution of iodine and stretching the resultant film at a ratio of from 3 times to 7 times with respect to its original length. The stretching may be carried out after the dyeing, the stretching may be carried out during the dyeing, or the stretching may be carried out before the dyeing. The polarizer may be produced by subjecting the film to treatments such as swelling, cross-linking, adjusting, washing with water, and drying in addition to the stretching and the dyeing.

Any appropriate film may be used as the protective layer. As a material for the main component of such film, there are specifically given, for example: cellulose-based resins, such as triacetylcellulose (TAG); and transparent resins, such as (meth)acrylic, polyester-based, polyvinyl alcohol-based, polycarbonate-based, polyamide-based, polyimide-based, polyether sulfone-based, polysulfone-based, polystyrene-based, polynorbornene-based, polyolefin-based, or acetate-based transparent, resins. In addition, examples thereof further include thermosetting resins and UV curable resins, such as acrylic, urethane-based, acrylic urethane-based, epoxy-based, or silicone-based thermosetting resins and UV curable resins. In addition, examples thereof further include glassy polymers, such as a siloxane-based polymer. In addition, a polymer-film described in Japanese Patent Application Laid-open No. 2001-343529 (International Patent WO01/37G07A) may also be used. For example, a resin composition containing a thermoplastic resin having in its side chain a substituted or unsubstituted imide group and a thermoplastic resin having in its side chain a substituted or unsubstituted phenyl group and a nitrile group may be used as a material for the film. An example thereof is a resin composition containing an alternating copolymer formed of isobutene and N-methylmaleimide and an acrylonitrile-styrene copolymer. The polymer film may be, for example, an extruded product of the resin composition.

B-1-2. Circularly Polarizing Plate (CP1)

A laminate of a linear polarizer and a λ/4 plate can be used as the circularly polarizing plate (CP1). The λ/4 plate has a function of transforming linearly polarized light into circularly polarized light (or circularly polarized light into linearly polarized light) when being laminated so that the absorption axis of the linear polarizer of the circularly polarizing plate (CP1) and the slow axis of the λ/4 plate thereof form an angle of about ±45°. A front retardation $R_0$ of the λ/4 plate at a wavelength of 590 nm is from 90 nm to 190 nm, preferably from 100 nm to 180 nm, more preferably from 110 nm to 170 nm. It should be noted that the front retardation $R_0$ is herein determined from the equation "$R_0=(nx-ny) \times d$" where nx represents a refractive index in the direction in which an in-plane refractive index becomes maximum (i.e., a slow axis direction), ny represents a refractive index in a direction perpendicular to the slow axis in a plane (i.e., a fast axis direction), and d (nm) represents the thickness of a retardation film, the parameters being values under a temperature of 23° C. The λ/4 plate shows any appropriate refractive index ellipsoid as long as the plate has the relationship of nx>ny. For example, the refractive index ellipsoid of the λ/4 plate shows the relationship of nx>nz>ny or nx>ny≥nz.

The angle between the absorption axis of the linear polarizer of the circularly polarizing plate (CP1) and the slow axis of the λ/4 plate thereof is preferably from +40° to +50° or from −40° to −50°, more preferably from +43° to +47° or from −43° to −47°, still more preferably +45° or −45°.

The circularly polarizing plate (CP1) is preferably arranged so that the λ/4 plate is positioned on a viewer side with respect to the linear polarizer. That is, the λ/4 plate, the linear polarizer, and the half mirror are preferably arranged in the stated order from the viewer side. With such arrangement, when both the first polarizing plate and the second polarizing plate are circularly polarizing plates, the first circularly polarizing plate can be caused to absorb circularly polarized light generated by being transmitted through the second polarizing plate, and hence an influence of the reflected image when the image display apparatus displays an image can be suppressed.

The thickness of the circularly polarizing plate (CP1) is preferably 200 µm or less, more preferably from 10 µm to 180 µm, still more preferably from 10 µm to 160 µm.

Any appropriate material can be used as a material for constituting the λ/4 plate as long as the effects of the present invention are obtained. A typical example thereof is a stretched film of a polymer film. As a resin for forming the polymer film, there are given, for example, a polycarbonate-based resin and a cycloolefin-based resin.

The λ/4 plate can be formed by stretching the polymer film. The front retardation and thickness direction retardation of the λ/4 plate can be controlled by adjusting the stretching ratio and stretching temperature of the polymer film.

The stretching ratio can be appropriately changed in accordance with, for example, a front retardation and a thickness direction retardation which the λ/4 plate is desired to have, a thickness which the λ/4 plate is desired to have, the kind of the resin to be used, the thickness of the polymer film to be used, and the stretching temperature. Specifically, the stretching ratio is preferably from 1.1 times to 2.5 times, more preferably from 1.25 times to 2.45 times, still more preferably from 1.4 times to 2.4 times.

The stretching temperature can be appropriately changed in accordance with, for example, a front retardation and a thickness direction retardation which the λ/4 plate is desired to have, a thickness which the λ/4 plate is desired to have, the kind of the resin to be used, the thickness of the polymer film to be used, and the stretching ratio. Specifically, the stretching temperature is preferably from 100° C. to 250° C., more preferably from 105° C. to 240° C., still more preferably from 110° C. to 240° C.

Any appropriate method is adopted as a stretching method as long as such optical characteristics and thickness as described above are obtained. Specific examples thereof include free-end stretching and fixed-end stretching. Of those, free-end uniaxial stretching is preferably used and free-end longitudinal uniaxial stretching is more preferably used.

The total light transmittance of the λ/4 plate is preferably 80% or more, more preferably 85% or more, still more preferably 90% or more.

For example, the linear polarizer described in the section B-1-1 can be used as the linear polarizer of the circularly polarizing plate.

C. Half Mirror

Any appropriate mirror can be used as the half mirror as long as the mirror can transmit part of incident light and reflect, other part thereof. Examples thereof include: a half mirror including a transparent base material and a metal thin film formed on the transparent base material; and a half mirror including a transparent base material and a dielectric multilayer film formed on the transparent base material.

Any appropriate material can be used as a material for constituting the transparent base material. Examples of the material include: transparent resin materials, such as polymethyl methacrylate, polycarbonate, and an epoxy resin; and glass. The thickness of the transparent base material is, for example, from 20 µm to 5,000 µm. The transparent base material is preferably free of a retardation.

A metal having a high light reflectance can be used as a material for constituting the metal thin film, and examples thereof include aluminum, silver, and tin. The metal thin film can be formed by, for example, plating or vapor deposition. The thickness of the metal thin film is, for example, from 2 nm to 80 nm, preferably from 3 nm to 50 nm.

In the dielectric multilayer film, a high-refractive index material and a low-refractive index material each having a predetermined thickness are laminated so that the film has a function as a mirror. The high-refractive index material and the low-refractive index material are preferably laminated in an alternate manner, and the function as the half mirror is expressed by utilizing the interference of light beams occurring upon their incidence from the low-refractive index material to the high-refractive index material. The half mirror including the dielectric multilayer film is preferred because its absorption of light is reduced.

The high-refractive index material has a refractive index of preferably more than 2.0, more preferably more than 2.0 and 3.0 or less. Specific examples of the high-refractive index material include $ZnS$—$SiO_2$, $TiO_2$, $ZrO_2$, and $Ta_2O_3$. The low-refractive index material has a refractive index of preferably from 1.2 to 2.0, more preferably from 1.4 to 1.9. Specific examples of the low-refractive index material include $SiO_2$, $Al_2O_3$, and $MgF$.

The visible light reflectance of the half mirror is preferably from 20% to 80%, more preferably from 30% to 70%, still more preferably from 40% to 60%. In addition, the visible light transmittance of the half mirror is preferably from 20% to 80%, more preferably from 30% to 70%, still more preferably from 40% to 60%. The visible light reflectance, the visible light transmittance, and a ratio therebetween (described later) can be adjusted by controlling the thickness of the metal thin film or the dielectric multilayer film.

The ratio between the visible light reflectance and visible light transmittance of the half mirror (reflectance:transmittance) is preferably from 2:8 to 8:2, more preferably from 3:7 to 7:3, still more preferably from 4:6 to 6:4. The ratio between the visible light reflectance and the visible light transmittance can be appropriately adjusted in accordance with, for example, the brightness of the image display apparatus.

D. Image Display Apparatus

Any appropriate apparatus can be used as the image display apparatus. Examples thereof include a liquid crystal display apparatus, an organic EL display apparatus, and a plasma display apparatus. Description is given below by taking the liquid crystal display apparatus as a typical example. In one embodiment, as illustrated in FIG. 2, the liquid crystal display apparatus includes a liquid crystal panel including a liquid crystal cell 3, a polarizing plate 1 arranged on the viewer side of the liquid crystal cell 3, and a polarizing plate 2 arranged on the back surface side of the liquid crystal cell 3. Although not shown, the image display apparatus can include any appropriate other member (such as a backlight unit) as required. In this embodiment, the polarizing plate 1 and the polarizing plate 2 can be arranged so that the absorption axes of their respective polarizers are substantially perpendicular or parallel to each other to enable the viewing of an Image.

When the linear polarizing plate is used as the first polarizing plate, the first polarizing plate and the polarizing plate 1 can be arranged so that the absorption axes of their respective polarizers are substantially parallel to each other.

In one embodiment, the linear polarizing plate is used as the first polarizing plate and the polarizing plate 1 is omitted from the image display apparatus (liquid crystal display apparatus) 13 illustrated in FIG. 2. That is, in this embodiment, a liquid crystal display apparatus free of a polarizing plate on the viewer side of its liquid crystal cell is used. In this case, the first polarizing plate and the polarizing plate 2 are arranged so that the absorption axes of their respective polarizers are substantially perpendicular or parallel to each other to enable the viewing of an image. In this embodiment, the brightness of the image display mirror can be improved because an optical loss due to the polarizing plate 1 can be eliminated.

D-1. Liquid Crystal Cell

The liquid crystal cell has a pair of substrates and a liquid crystal layer serving as a display medium sandwiched between the substrates. In a general construction, a color filter and a black matrix are arranged on one of the substrates, and a switching element for controlling the electrooptical characteristics of a liquid crystal, a scanning line for providing the switching element, with a gate signal and a signal line for providing the element with a source signal, and a pixel electrode and a counter electrode are arranged on the other substrate. An interval between the substrates (cell gap) can be controlled with, for example, a spacer. For example, an alignment film formed of polyimide can be arranged on the side of each of the substrates to be brought into contact with the liquid crystal layer.

In one embodiment, the liquid crystal layer contains liquid crystal molecules aligned in a homogeneous array under a state in which no electric field is present. Such liquid crystal layer (resultantly the liquid crystal cell) typically shows a three-dimensional refractive index of $nx>ny=nz$. It should be noted that the expression "ny=nz" as used herein includes not only the case where ny and nz are completely equal to each other but also the case where ny and nz are substantially equal to each other. Typical examples of a driving mode using the liquid crystal layer showing such three-dimensional refractive index include an in-plane switching (IPS) mode and a fringe field switching (FFS) mode. It should be noted that the IPS mode includes a super in-plane switching (S-IPS) mode and an advanced super in-plane switching (AS-IPS) mode each adopting a V-shaped electrode, a zigzag electrode, or the like. In addition, the FFS mode includes an advanced fringe field switching (A-FFS) mode and an ultra fringe field switching (U-FFS) mode each adopting a V-shaped electrode, a zigzag electrode, or the like.

In another embodiment, the liquid crystal layer contains liquid crystal molecules aligned in a homeotropic array under a state in which no electric field is present. Such liquid crystal layer (resultantly the liquid crystal cell) typically shows a three-dimensional refractive index of $nz>nx=ny$. A driving mode using the liquid crystal molecules aligned in the homeotropic array under a state in which no electric field is present is, for example, a vertical alignment (VA) mode. The VA mode includes a multi-domain VA (MVA) mode.

D-2. Polarizing Plate 1 and Polarizing Plate 2

Such linear polarizing plate as described in the section B-1-1 can be used as each of the polarizing plate 1 and the polarizing plate 2.

E. Second Polarizing Plate

A linear polarizing plate (LP2) or a circularly polarizing plate (CP2) can be used as the second polarizing plate. When the linear polarizing plate (LP1) is used as the first polarizing plate, the linear polarizing plate (LP2) can be used as the second polarizing plate. On the other hand, when the circularly polarizing plate (CP1) is used as the first polarizing plate, the circularly polarizing plate (CP2) can be used as the second polarizing plate.

E-1. Linear Polarizing Plate (LP1)

The linear polarizing plate described in the section B-1-1 can be used as the linear polarizing plate (LP1).

E-2. Circularly Polarizing Plate (CP2)

The circularly polarizing plate described in the section B-1-2 can be used as the circularly polarizing plate (CP2).

It is preferred that: the vehicle of the present, invention be configured so that circularly polarized light output from the second polarizing plate is caused to enter the image display mirror; and the circularly polarizing plate (CP2) be arranged so that the λ/4 plate is positioned on a light output, side with respect to the linear polarizer (a side closer to the image display mirror; the lower side of the drawing sheet in each of FIG. 3A and FIG. 3B). At this time, the absorption axes of the linear polarizers of the circularly polarizing plate (CP2) serving as the second polarizing plate and the circularly polarizing plate (CP1) serving as the first polarizing plate are each adjusted to such an angle that the circularly polarized light generated by being transmitted through the second polarizing plate is absorbed by the first polarizing plate.

F. Set of Image Display Mirror and Second Polarizing Plate

In one embodiment, there is provided a set of the image display mirror and the second polarizing plate. The set is applicable to a vehicle. The image display mirror and the second polarizing plate constituting the set, and methods of arranging the mirror and the plate are as described above.

What is claimed is:

1. A vehicle, comprising:
an image display mirror including a first polarizing plate, a half mirror, and an image display apparatus in the stated order from a viewer side; and
a second polarizing plate,
wherein:
the image display mirror is arranged so as to be viewable by a driver of the vehicle;
the half mirror is configured to be oriented in different directions between when an image is displayed on the image display apparatus and when the image is not displayed thereon;
the second polarizing plate is arranged so that light transmitted through the second polarizing plate reaches a first polarizing plate side of the image display mirror when the image is displayed on the image display apparatus;
the vehicle is configured so that the transmitted light of the second polarizing plate reaching the image display mirror is prevented from being transmitted through the first polarizing plate;
the vehicle comprises a ceiling that transmits light; and
the second polarizing plate is arranged on the ceiling.

2. The vehicle according to claim 1, wherein the half mirror is configured to have, when the image is not displayed, such an arrangement and an angle that the driver is capable of observing a rear with a reflected image, and to be oriented, when the image is displayed, in a direction different from that when the image is not displayed.

3. The vehicle according to claim 1, wherein a position of the first polarizing plate is movable relative to a position of the image display apparatus.

4. The vehicle according to claim 1, wherein a position of the half mirror is movable relative to a position of the image display apparatus.

5. The vehicle according to claim 1, wherein the first polarizing plate and the second polarizing plate are circularly polarizing plates.

* * * * *